United States Patent
Tily et al.

(10) Patent No.: US 12,271,459 B2
(45) Date of Patent: Apr. 8, 2025

(54) USER AUTHENTICATION BY A WEARABLE DEVICE

(71) Applicant: Oura Health Oy, Oulu (FI)

(72) Inventors: Hal Tily, Oulu (FI); Kimmo Suotsalo, Oulu (FI); Matti Rusila, Oulu (FI); Vertti Poikola, Oulu (FI); Jukka Partanen, Oulu (FI)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 18/087,590

(22) Filed: Dec. 22, 2022

(65) Prior Publication Data

US 2023/0214470 A1   Jul. 6, 2023

Related U.S. Application Data

(60) Provisional application No. 63/295,040, filed on Dec. 30, 2021.

(51) Int. Cl.
| | | |
|---|---|---|
| *G06F 21/00* | (2013.01) | |
| *G06F 21/32* | (2013.01) | |
| *G06Q 20/32* | (2012.01) | |
| *G06Q 20/40* | (2012.01) | |

(52) U.S. Cl.
CPC .......... *G06F 21/32* (2013.01); *G06Q 20/321* (2020.05); *G06Q 20/40145* (2013.01)

(58) Field of Classification Search
CPC .................. G06F 21/32; G06Q 20/321; G06Q 20/40145
See application file for complete search history.

(56) References Cited

U.S. PATENT DOCUMENTS

| | | | |
|---|---|---|---|
| 11,158,149 B2* | 10/2021 | Robertson | A61B 5/0028 |
| 2015/0135310 A1 | 5/2015 | Lee | |
| 2016/0313176 A1* | 10/2016 | Lee | A61B 5/02438 |
| 2016/0350581 A1* | 12/2016 | Manuel | G06V 40/11 |
| 2016/0360998 A1* | 12/2016 | Jun | A61B 5/681 |
| 2017/0032168 A1 | 2/2017 | Kim | |
| 2017/0061405 A1* | 3/2017 | Bryant | G06Q 20/4014 |
| 2017/0061424 A1* | 3/2017 | Dent | G06Q 20/3224 |
| 2017/0209055 A1* | 7/2017 | Pantelopoulos | A61B 5/7203 |
| 2018/0004926 A1* | 1/2018 | Huxham | G06F 21/35 |
| 2019/0347386 A1 | 11/2019 | Rahmel et al. | |
| 2020/0213300 A1* | 7/2020 | Edwards | G06Q 20/321 |

(Continued)

FOREIGN PATENT DOCUMENTS

WO   WO-2020223807 A1   11/2020

OTHER PUBLICATIONS

International Search Report and Written Opinion—PCT/US2022082342—ISA/EPO—Apr. 26, 2024.

*Primary Examiner* — William A Corum, Jr.
(74) *Attorney, Agent, or Firm* — Holland & Hart LLP

(57) ABSTRACT

Methods, systems, and devices for operating a wearable device are described. The wearable device may determine that a user is wearing the wearable device. The wearable device may collect physiological data from the user based on determining that the user is wearing the wearable device. The wearable device may then determine an identity of the user based at least in part on the collected physiological data matching a physiological profile associated with the identity. The wearable device may then authenticate the user for an action by the wearable device that requires user authentication.

19 Claims, 7 Drawing Sheets

(56) References Cited

U.S. PATENT DOCUMENTS

| | | | |
|---|---|---|---|
| 2020/0342086 A1* | 10/2020 | Oung | H04L 63/0861 |
| 2021/0320918 A1* | 10/2021 | Mars | H04W 12/06 |
| 2023/0081794 A1* | 3/2023 | Mäkinen | G01N 21/4133 |
| | | | 356/614 |

* cited by examiner

USER AUTHENTICATION BY A WEARABLE DEVICE

CROSS REFERENCE

The present Application for Patent claims the benefit of U.S. Provisional Patent Application No. 63/295,040 by Tily et al., entitled "USER AUTHENTICATION BY A WEARABLE DEVICE," filed Dec. 30, 2021, assigned to the assignee hereof, and expressly incorporated by reference herein.

FIELD OF TECHNOLOGY

The following relates to wearable devices and data processing, including user authentication by a wearable device.

BACKGROUND

Some wearable devices may be configured to collect personal data from users. For example, a wearable device may include one or more sensors that collect physiological data from a user. A wearable device may also be able to perform various actions, such as payment transactions or access procedures. Improved techniques for performing actions by a wearable device may be desired.

DETAILED DESCRIPTION

A wearable device may be configured to perform various actions on behalf of a user, such as payment transactions or access procedures. But in some cases, an unauthorized person may gain access to the wearable device and use the wearable device to perform actions that are limited to the authorized user. For example, the unauthorized person may use the wearable device to illegitimately make a payment, sign-in to an account, or access a restricted area. According to the techniques described herein, a wearable device may perform an authentication procedure before allowing a person to initiate an action that is limited to the authorized user of the wearable device.

To support the authentication procedure, the wearable device may collect physiological data for the authorized user so that the wearable device can build a physiological profile for the authorized user. Upon detecting that the wearable device is being worn by a person, the wearable device may collect physiological data from the person and compare that physiological data with the physiological profile of the authorized user. If the physiological data from the person matches the profile of the authorized user, the wearable device may identify the person as the authorized user and authenticate the person. Otherwise (e.g., if the physiological data from the person does not match the physiological profile of the authorized user), the wearable device may flag the person as an unauthorized user of the wearable device and prevent the person from initiating actions that require user authentication. A physiological profile may also be referred to as physiological signature, a physiological pattern, or a biometric profile, among other suitable terminology.

Aspects of the disclosure are initially described in the context of systems supporting physiological data collection from users via wearable devices. Aspects of the disclosure are further illustrated by and described with reference to apparatus diagrams, system diagrams, and flowcharts that relate to user authentication by a wearable device.

Figure 1:
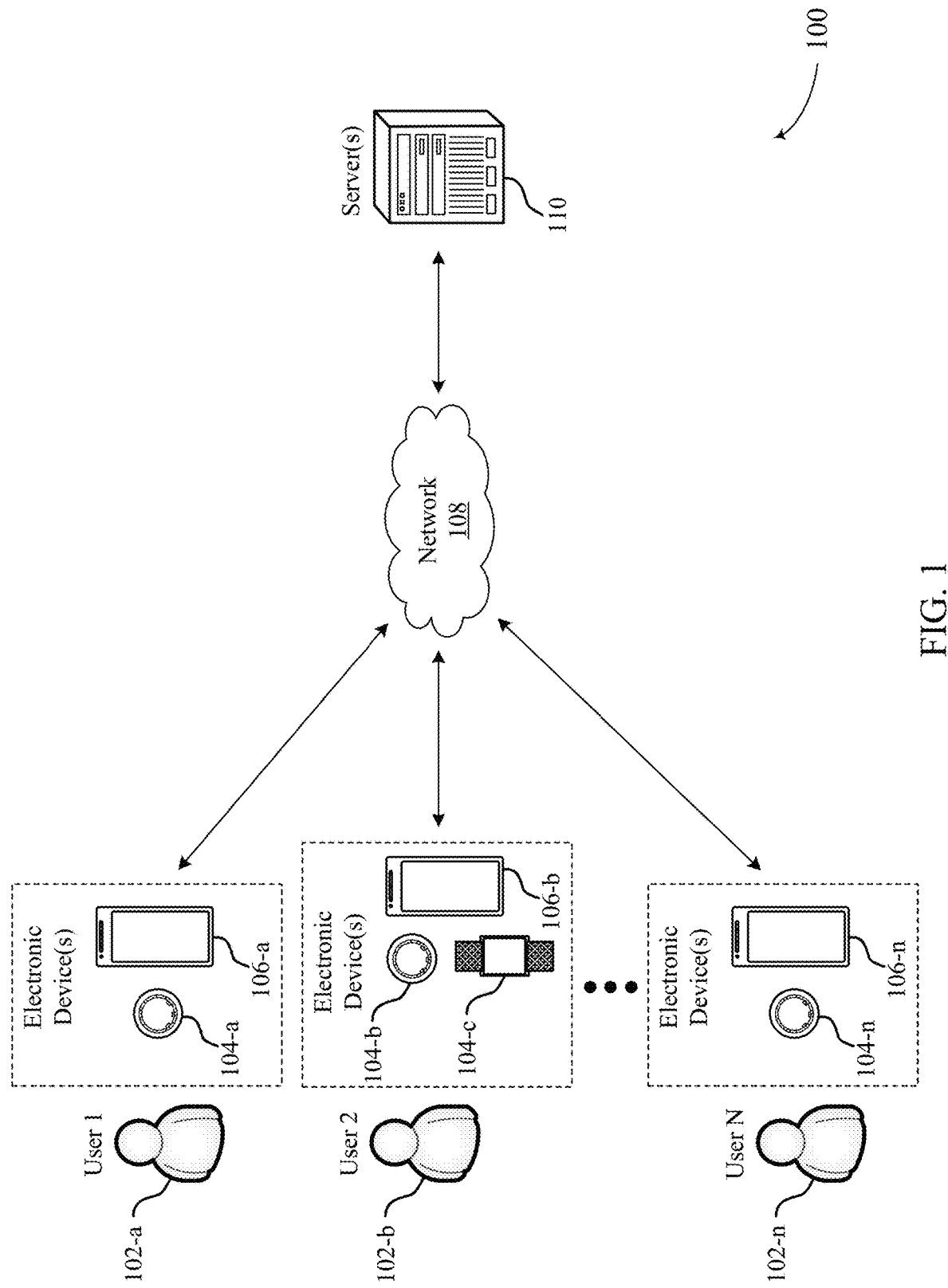
FIG. 1 illustrates an example of a system that supports user authentication by a wearable device in accordance with aspects of the present disclosure.

FIG. 1 illustrates an example of a system 100 that supports user authentication by a wearable device in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, which may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more LEDs (e.g., red LEDs, green LEDs) that emit light on the palm-side of a user's finger to collect physiological data based on arterial blood flow within the user's finger. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof. In general, the terms light-emitting components, light-emitting elements, and like terms, may include, but are not limited to, LEDs, micro LEDs, mini LEDs, laser diodes (LDs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that use LEDs which are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-a associated with the first user 102-a may be communicatively coupled to the user device 106-a, where the user device 106-a is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time during which a user 102 is asleep, and classify periods of time during which the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time during which the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a GUI of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, which repeats approximately every 24 hours. In this regard, techniques described herein may utilize circadian rhythm adjustment models to improve physiological data collection, analysis, and data processing.

For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, a wearable device 104 may be configured to authenticate a user 102 as an authorized user of the wearable device 104 (or as an authorized user for one or more action) before permitting the user 102 to initiate an action limited to the authorized user. For example, upon determining that a person is wearing the wearable device 104, the wearable device 104 may collect physiological data for the person and compare that physiological data with a physiological profile associated with the authorized user. If the physiological data from the person matches the physiological profile for the authorized user, the wearable device 104 may authenticate the person as the authorized user. If the physiological data from the person does not match the physiological profile for the authorized user, the wearable device 104 may not authenticate the person as the authorized user.

Upon authenticating the person, the wearable device 104 may permit the person to initiate various actions limited to the authorized user. For example, the wearable device 104 may permit the person to initiate a payment procedure, an access procedure, or a sign-in procedure. To prevent an unauthorized user from later using the wearable device 104 to initiate such transactions, the wearable device 104 may perform the authentication procedure each time the wearable device 104 senses that the wearable device 104 has been removed. For example, after authenticating a person, the wearable device 104 may perform the authentication procedure again if the wearable device 104 determines that the wearable device 104 has been removed since authentication of the person.

Because physiological data is person-specific, use of physiological data to perform user authentication may require less effort from the user, and may be more reliable, than other techniques (e.g., those that rely on passcodes, which require input from the user and can be used by unauthorized users). Use of physiological data to perform user authentication may also ensure that the physiological data collected for a person (e.g., for insurance rate or rebate purposes, for clinical trial purposes) is associated with the correct person.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
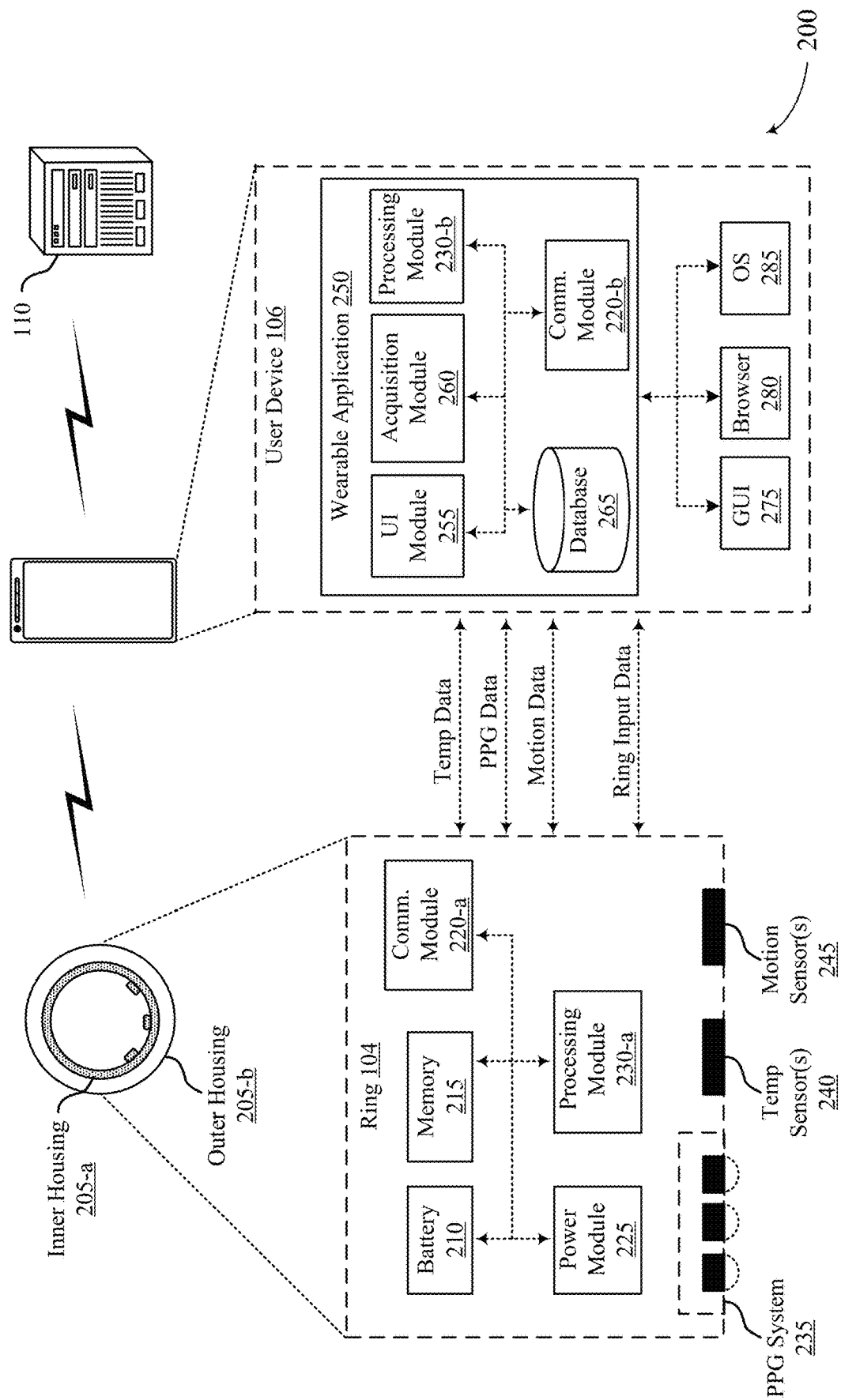
FIG. 2 illustrates an example of a system that supports user authentication by a wearable device in accordance with aspects of the present disclosure.

FIG. 2 illustrates an example of a system 200 that supports user authentication by a wearable device in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

System 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-*a*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-*a* of the ring 104 may include one or more processors (e.g., processing units), microcontrollers, digital signal processors, systems on a chip (SOCs), and/or other processing devices. The processing module 230-*a* communicates with the modules included in the ring 104. For example, the processing module 230-*a* may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 in which the optical receiver(s) receive transmitted light that is reflected through the region of the user's finger. In some implementations, the PPG system 235 may be configured as a transmissive PPG system 235 in which the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform, which may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMl160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-a may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS) 285, a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time in which the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for authenticating users. For example, the ring 104 may (e.g., over a period of time) collect physiological data for an authorized user and use the physiological data to build a physiological profile for the authorized user. The ring 104 may then use the physiological profile to authenticate a user of the ring 104. The ring 104 may store the physiological profile at a memory of the ring 104 (e.g., at the memory 215), may communicate the physiological profile to the user device 106, or both. Storing the physiological profile at the memory 215 may allow the ring 104 to perform an authentication procedure using the physiological profile even in the absence of a wireless connection (e.g., the ring 104 may perform the authentication procedure using the physiological profile without communicating with another device, such as the user device 106). If the ring 104 does communicate the physiological profile to the user device 106 (which may allow the ring 104 preserve space in the memory 215), the ring 104 may request (and receive) the physiological profile from the user device 106 so that the ring 104 can perform an authentication procedure.

Because the ring 104 is a wearable device that collects physiological data continuously or over long stretches of time, the physiological profile built by the ring 104 may be more comprehensive (e.g., include more user-specific biometric factors), robust (e.g., harder to spoof), and/or reliable (e.g., more consistent) than other physiological profiles that are based on snapshots of physiological data. Although described with reference to a wearable ring device, the authentication techniques described herein may be implemented using any type of wearable device.

Figure 3:
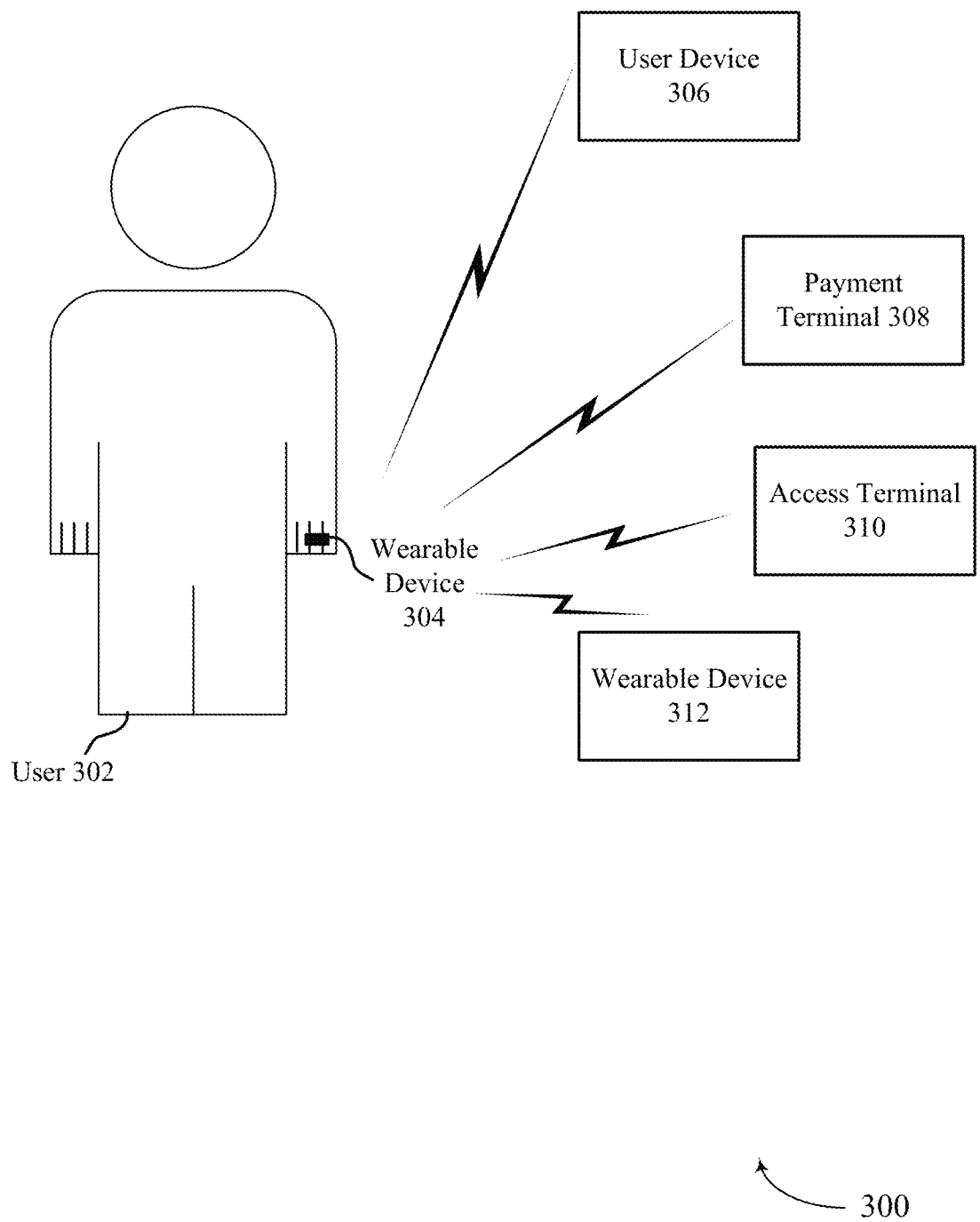
FIG. 3 illustrates an example of a system that supports user authentication by a wearable device in accordance with aspects of the present disclosure.

FIG. 3 illustrates an example of a system 300 that supports user authentication by a wearable device in accordance with aspects of the present disclosure. The system 300 may include a wearable device 304 and an associated user device 306. The system 300 may also include a payment terminal 308, which may be configured to wirelessly perform payment transactions, an access terminal 310, which may be configured to wirelessly grant access to restricted area (e.g., a building, a room, a vehicle) or electronic device (e.g., a computer, a phone), and a wearable device 312, which may be similar to the wearable device 304.

The wearable device 304 may use physiological data to perform an authentication procedure for the user 302 in which the identity of the user 302 is determined. For example, upon determining that a person (e.g., the user 302) is wearing the wearable device 304 (or in response to a prompt by another device, such as the user device 306), the wearable device 304 may collect physiological data from the user 302 and compare the collected physiological to a physiological profile for the authorized user of the wearable device 304. If the physiological data is sufficiently similar to the physiological profile (e.g., if the physiological data matches the physiological profile or is within a margin of error), the wearable device 304 may authenticate the user 302 (e.g., the wearable device 304 may determine the identity of the user 302 as that of the authorized user). The wearable device 304 may collect the physiological data for the user 302 using one or more sensors that interface with the skin of the user 302.

In some examples, the physiological profile may be based on, or include, PPG data, which may also be referred to as a PPG signal pattern or other suitable terminology. The physiological profile may include various characteristics of the authorized user, such as heart rate, heart rate variability, blood pressure, oxygen saturation, breathing, artery stiffness, body impedance, appendage size (e.g., finger size), temperature (e.g., basal body temperature), pulse characteristics (e.g., systolic amplitude, systolic width, rise width, pulse length to systolic amplitude ratio, crest time), or any combination thereof.

The physiological characteristics may be based on or derived from the PPG data or other physiological data collected by the wearable device. Some physiological characteristics may also be based on or derived from data received from other devices. For instance, the wearable device 304 may determine an impedance for the authorized user based on data from another wearable device (e.g., a ring, a watch, an ankle bracelet) worn by the authorized. In some examples, the wearable device 304 may use the impedance to determine other physiological characteristics for the user 302, such as body composition (e.g., the percentage of muscle, fat, water), that can be used for authentication.

For comparison purposes, the physiological data collected for the user 302 correspond to the physiological characteristics include the physiological profile for the authorized user. For example, if the physiological profile for the authorized user includes PPG data, such as heart rate, temperature, and impedance, the physiological data collected for the user 302 may include PPG data for the same physiological characteristics (e.g., heart rate, temperature, and impedance).

In some examples, the wearable device 304 may use a neural network, such as a deep neural network, to perform authentication using physiological data. For example the wearable device 304 may use a Siamese neural network that includes two sister networks. Each sister network may include a quantity of hidden layers and may use the same weights while working in tandem on two different input vectors. The Siamese neural network may operate on collected physiological data for the user 302 and physiological data from the physiological profile of the authorized user and output a value (e.g. a binary value) that indicates whether the user 302 is the authorized user. For example, the Siamese neural network may operate on pairs of pulses (where each pair includes a pulse for the user 302 and a pulse for the authorized user) to extract pulse characteristics that are used to authenticate the user 302. A physiological characteristic may also be referred to as a physiological feature.

To train the Siamese neural network, the pulse pair inputs may be formed by iterating through each of the pulses in the training set, selecting the current pulse as an anchor, and pairing the anchor with one positive example and one negative example. Each positive example may be sampled randomly among the pulses of the same user, excluding the anchor pulse; and each negative example may be sampled randomly among the pulses of the other users. The same procedure may be repeated for the validation set. Other examples of neural networks and training are contemplated and within the scope of the present disclosure.

In some examples, the wearable device 304 may normalize the physiological data collected for the user 302 before comparing the physiological data with the physiological profile for the authorized user. Normalizing physiological data may refer to scaling the physiological data. Normalizing the physiological data may allow the wearable device 304 to compensate for differences in physiological data that arise when the user 302 is in a different condition (e.g., ill versus healthy), performing a different activity (e.g., exercising versus resting), or in a different environment (e.g., at higher altitude versus at lower altitude) relative to when the physiological profile was built. Thus, the wearable device 304 may normalize physiological data for the user 302 based on a condition of the user 302, based on an activity being performed by the user 302, based on an environment of the user 302, or any combination thereof.

In some examples, the physiological profile may include one or more acceleration patterns or motion patterns for the authorized user. For example, the physiological profile may include hand movement patterns routinely performed by the authorized user or gait patterns (based on e.g., step cadence, arm speed, arm angle, arm swing profile) for the authorized user, which may be based on accelerometer data and/or gyroscope data for the authorized user.

As another examples, the physiological profile may include one or more hand gestures predefined by the user 302. The hand gesture may be a waving pattern, a tapping pattern (e.g., tapping of finger on the wearable device 304, or tapping of the ring-finger or ring-hand on a surface), or a rotation pattern (e.g., rotation of the wearable device 304 around an appendage of the user 302, like rotating the dial on a combination lock). For instance, the user 302 could start the wearable device 304 in a first orientation, and then rotate the wearable device 304 around the user's finger a certain number of times and/or back and forth at certain angles/degrees.

In addition to physiological characteristics and motions patterns, the wearable device 304 may use other factors (e.g., geographical location, proximity to the user device) to authenticate the user 302. For example, the wearable device 304 may authenticate the user 302 if the user 302 is at an expected geographical location at a certain time of day (e.g., as part of the user's commute). The wearable device 304 may determine the location of the user 302 by communicating with a user device or one or more nearby devices with known geographical locations. Additionally or alternatively, the wearable device 304 may authenticate the user 302 if the user 302 (and thus the wearable device 304) is within a threshold distance of the user device 306 associated with the authorized user.

After authenticating the user 302, the wearable device 304 may continue to consider the user 302 as the authorized user for a threshold period of time or until a triggering event causes the wearable device 304 to perform a new authentication procedure. Examples of triggering events include completion of an action that requires authentication or removal of the wearable device 304 from the user 302.

The wearable device 304 may determine that the wearable device 304 has been removed based on a discontinuity in signals sensed by sensors of the wearable device 304. For example, the wearable device 304 may determine that the wearable device 304 has been removed if the wearable device 304 determines that the wearable device 304 has been unable to detect physiological signals (such as a pulse) from the user 106 for a threshold amount of time. Additionally or alternatively, the wearable device 304 may determine that the wearable device 304 has been removed based on detecting rotation of the wearable device 304, axial rotation of the wearable device 304, or both. Additionally or alternatively, the wearable device 304 may determine that the wearable device 304 has been removed (e.g., slid from the finger of the authorized user to an imposter) based on a change in PPG data quality, a change in light, a change in temperature, or a change in pressure. For example, the wearable device 304 may include a photodetector that is positioned opposite an optical transmitter (e.g., on the interior surface of the inner housing 205-a) so that the photodetector detects light emitted by the optical transmitter unless an obstruction (e.g., the user's finger) blocks the light. In such an example, the wearable device 304 may detect removal of the wearable device 304 based on a disruption in light detected by the photodetector.

After authorizing the user 302, the wearable device 304 may activate a communication component (e.g., the communication module 220-a). The wearable device 304 may activate the communication component in response to authorizing the user 302, in response to an unlocking action by the user 302, or both. The wearable device 304 may also permit the user 302 to initiate various actions that require authentication (e.g., actions that are limited to the authorized user). For instance, the wearable device 304 may allow the user 302 to initiate a payment transaction with the payment terminal 308 (e.g., using the communication component). As another example, the wearable device 304 may allow the user 302 to initiate an access procedure with the access terminal 310 (e.g., using the communication component). As another example, the wearable device 304 may allow the user 302 to initiate a data transfer with the user device 306, the wearable device 312, or both. In some examples (e.g., in a two-factor authentication scenario), the wearable device 304 may send to another device (e.g., the user device 306) an indication that the user 302 has been authenticated so that the other device can grant the user 302 access to an area, electronic device, account, or application that is restricted to the authorized user.

To prevent the user 302 from inadvertently initiating an action (e.g., activating the communication component, making a payment) after being authenticated, the wearable device 304 may require the user 302 to perform an unlocking action before the wearable device 304 initiates the action. For example, even if the user 302 is authenticated, the wearable device 304 may not initiate a payment transaction unless the user 302 makes a predefined gesture (such as tapping the wearable device 304 on the payment terminal 308, or waving the wearable device 304 over the payment terminal 308 in a predefined pattern, or using a finger to tap the wearable device 304 with a predetermined pattern or tempo, or rotating the wearable device 304 in a predetermined pattern).

In some examples, the wearable device 304 may prevent the user 302 from initiating an action (even if the user 302 is authenticated and performs the requisite unlocking action) until the wearable device 304 authenticates a state of the user 302. For example, the wearable device 304 may prevent the user 302 from accessing a motor vehicle if the user 302 is inebriated or drowsy. The wearable device 304 may prevent the user 302 from initiating an action by deactivating the communication component or refraining from communicating with a gatekeeper device (e.g., the access terminal 310). Alternatively, the wearable device 304 may prevent the action by alerting the gatekeeper device of the state of the user 302 (so that the gatekeeper device rejects an attempt to initiate the action by the user 302). In some examples, the wearable device 304 may alert the user 302 of the state of the user. For instance, the wearable device 304 may vibrate or output a signal (e.g., a visual signal, an auditory signal) that indicates the state of the user, or the wearable device 304 may communicate the state to the user device 306 so that the user device 306 can alert the user 302.

In addition to authenticating the user 302 to initiate certain actions, the wearable device 304 may also authenticate the user 302 so that the wearable device 304 can autonomously perform certain actions that are specific to the authorized user. For example, the wearable device 304 may authenticate the user 302 as the correct person for data collection before collecting physiological data for insurance or clinical trial purposes (which may prevent the wearable device 304 from collecting physiological data for an imposter). Additionally or alternatively, the wearable device 304 may authenticate the user 302 before collecting physiological data for use by the wearable device 304 or before collecting physiological data to update the physiological profile for the authorized user.

As noted, the wearable device 304 may include a communication component that is configured to wirelessly communicate with other devices. In some examples, the communication may be an NFC component, which may help prevent accidental action initiation due to NFC range limitations. Use of an NFC component may also allow for charging of the wearable device 304 and may be simpler to implement relative to other wireless communication technology. However, the communication component is not limited to the NFC technology and may implement other types of wireless communication technologies such as Wi-Fi and Bluetooth, among others.

In some examples, the communication component may be used to transfer data between the wearable device 304 and another device (e.g., the user device 306, the wearable device 312). As noted, authentication of the user 302 (plus possibly an unlocking action by the user 302) may activate the communication component. After the communication component is activated, a triggering action (e.g., tapping the wearable device 304 against the other device) may prompt the wearable device 304 to exchange data with the other device. The triggering action may also initiate an exchange of a token directly between the wearable device 304 and the other device, and the token may be used by the user device 306 (or some other device or application) to authenticate the users (of the wearable device 304 and the other device) and initiate data transfer. In some cases, the user 302 may tap the wearable device 304 against the other device to trigger some action by the other device (like put the other device into airplane mode).

Figure 4:
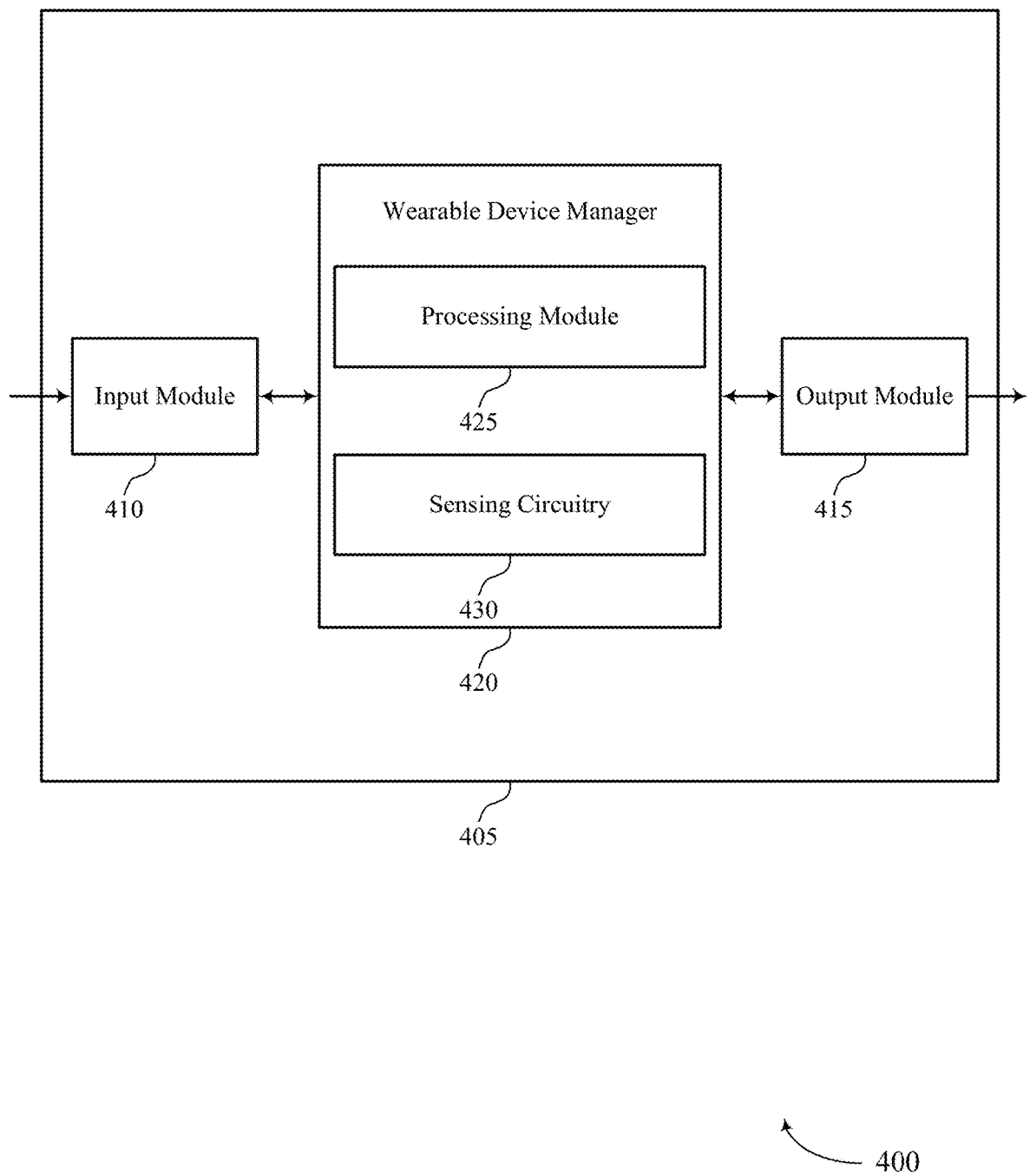
FIG. 4 shows a block diagram of an apparatus that supports user authentication by a wearable device in accordance with aspects of the present disclosure.

FIG. 4 shows a block diagram 400 of a device 405 that supports user authentication by a wearable device in accordance with aspects of the present disclosure. The device 405 may include an input module 410, an output module 415, and a wearable device manager 420. The device 405 may also include a processor. Each of these components may be in communication with one another (e.g., via one or more buses).

For example, the wearable device manager 420 may include a processing module 425 a sensing circuitry 430, or any combination thereof. In some examples, the wearable device manager 420, or various components thereof, may be configured to perform various operations (e.g., receiving, monitoring, transmitting) using or otherwise in cooperation with the input module 410, the output module 415, or both. For example, the wearable device manager 420 may receive information from the input module 410, send information to the output module 415, or be integrated in combination with the input module 410, the output module 415, or both to receive information, transmit information, or perform various other operations as described herein.

The processing module 425 may be configured as or otherwise support a means for determining, by the wearable device, that a user is wearing the wearable device on a finger of the user. The sensing circuitry 430 may be configured as or otherwise support a means for collecting physiological data from the user based at least in part on determining that the user is wearing the wearable device. The processing module 425 may be configured as or otherwise support a means for determining an identity of the user based at least in part on the collected physiological data matching a physiological profile associated with the identity. The processing module 425 may be configured as or otherwise support a means for authenticating the user for an action by the wearable device that requires user authentication.

Figure 5:
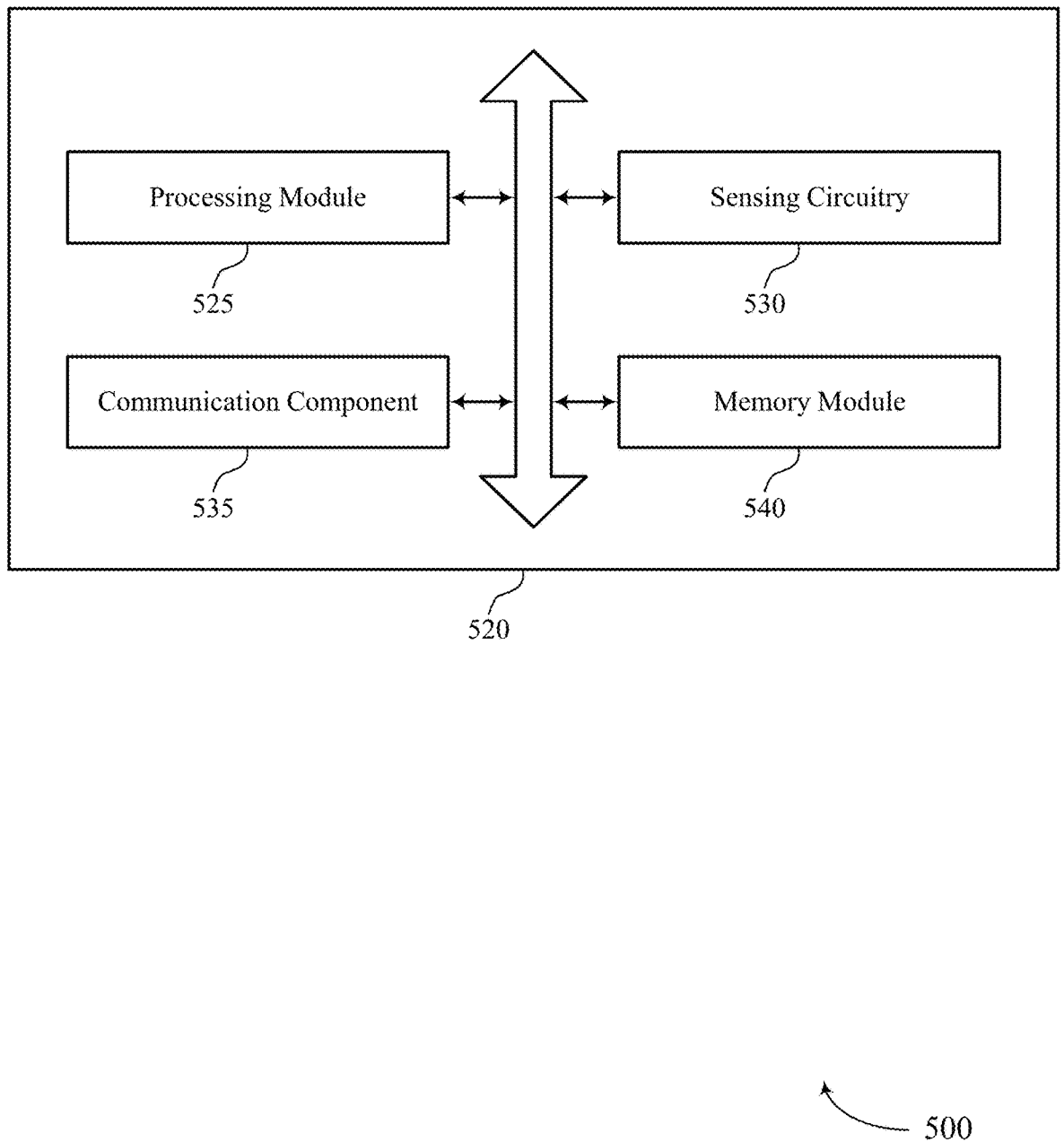
FIG. 5 shows a block diagram of a wearable device manager that supports user authentication by a wearable device in accordance with aspects of the present disclosure.

FIG. 5 shows a block diagram 500 of a wearable device manager 520 that supports user authentication by a wearable device in accordance with aspects of the present disclosure. The wearable device manager 520 may be an example of aspects of a wearable device manager or a wearable device manager 420, or both, as described herein. The wearable device manager 520, or various components thereof, may be an example of means for performing various aspects of user authentication by a wearable device as described herein. For example, the wearable device manager 520 may include a processing module 525, a sensing circuitry 530, a communication component 535, a memory module 540, or any combination thereof. Each of these components may communicate, directly or indirectly, with one another (e.g., via one or more buses).

The processing module 525 may be configured as or otherwise support a means for determining, by the wearable device, that a user is wearing the wearable device on a finger of the user. The sensing circuitry 530 may be configured as or otherwise support a means for collecting physiological data from the user based at least in part on determining that the user is wearing the wearable device. In some examples, the processing module 525 may be configured as or otherwise support a means for determining an identity of the user based at least in part on the collected physiological data matching a physiological profile associated with the identity (e.g., the processing module 525 may determine that the user is an authorized user based on the collected physiological data matching a physiological profile associated with the authorized user). In some examples, the processing module 525 may be configured as or otherwise support a means for authenticating the user for an action by the wearable device that requires user authentication.

In some examples, the communication component 535 may be configured as or otherwise support a means for initiating the action based at least in part on authenticating the user. In some examples, the processing module 525 may be configured as or otherwise support a means for determining that the wearable device has remained on the finger of the user since authenticating the user, wherein the action is initiated based at least in part on determining that the wearable device has remained on the finger of the user since authenticating the user.

In some examples, the action comprises a payment transaction. In some examples, the action comprises collecting additional physiological data for the identity.

In some examples, the processing module 525 may be configured as or otherwise support a means for activating a communication component based at least in part on authenticating the user and based at least in part on a gesture made by the user or a proximity of the wearable device to the user.

In some examples, the processing module 525 may be configured as or otherwise support a means for deactivating the communication component based at least in part on a threshold duration expiring since activating the communication component, based at least in part on completing the action, based at least in part on the proximity of the wearable device to the user exceeding a threshold distance, or any combination thereof.

In some examples, the gesture comprises tapping the wearable device on a payment terminal, and the communication component 535 may be configured as or otherwise support a means for communicating payment information to the payment terminal based at least in part on activating the communication component.

In some examples, the sensing circuitry 530 may be configured as or otherwise support a means for collecting accelerometer data for the user, wherein the gesture is determined based at least in part on the accelerometer data.

In some examples, the processing module 525 may be configured as or otherwise support a means for determining the physiological profile over a period of time. In some examples, the processing module 525 may be configured as or otherwise support a means for storing the physiological profile in a memory of the wearable device, communicating the physiological profile to a user device, or both.

In some examples, the physiological profile is determined in the absence of a wireless connection, the identity of the user is determined in the absence of a wireless connection, and the user is authenticated in the absence of a wireless connection.

In some examples, the physiological profile comprises PPG data. In some examples, the processing module 525 may be configured as or otherwise support a means for determining one or more physiological characteristics of the user based at least in part on the PPG data, wherein the identity of the user is determined based at least in part on the one or more physiological characteristics.

In some examples, the one or more physiological characteristics comprises heart rate, heart rate variability, blood pressure, or a combination thereof. In some examples, the physiological data comprises second PPG data, and the processing module 525 may be configured as or otherwise support a means for normalizing the second PPG data based at least in part on an activity being performed by the user, based at least in part on a condition associated with the user, or both.

In some examples, the physiological profile comprises a motion pattern associated with movement of the user. In some examples, the motion pattern comprises a predefined hand gesture performed by the user. In some examples, the hand gesture comprises a rotation pattern of the wearable device about the finger of the user.

In some examples, the processing module 525 may be configured as or otherwise support a means for determining a geographical location of the user, wherein the identity of the user is determined based at least in part on the geographical location of the user.

In some examples, the processing module 525 may be configured as or otherwise support a means for determining a proximity of the wearable device to a user device associated with the identity, wherein the identity of the user is determined based at least in part on the proximity of the wearable device to the user device.

In some examples (e.g., when authenticating the user is part of a first authentication procedure), and the processing module 525 may be configured as or otherwise support a means for determining that the user has removed the wearable device since authentication of the user. In such examples, and the processing module 525 may be configured as or otherwise support a means for performing a second authentication procedure for the user based at least in part on determining that the user has removed the wearable device since authentication of the user.

In some examples, the processing module 525 may be configured as or otherwise support a means for activating a communication component based at least in part on authenticating the user. In some examples, the communication component 535 may be configured as or otherwise support a means for performing an access procedure or sign-in procedure using the communication component.

In some examples, the processing module 525 may be configured as or otherwise support a means for activating a communication component based at least in part on authenticating the user. In some examples, the communication component 535 may be configured as or otherwise support a means for initiating a data transfer with another device based at least in part on activating the communication component.

In some examples, the processing module 525 may be configured as or otherwise support a means for determining that the wearable device is within a threshold distance of the other device, wherein the data transfer is initiated based at least in part on determining that the wearable device is within the threshold distance of the other device.

In some examples, the physiological data is collected using one or more sensors of the wearable device, and the memory module 540 may be configured as or otherwise support a means for storing the physiological data in a memory of the wearable device.

In some examples, the wearable device comprises a wearable ring device.

In some examples, the wearable device collects the physiological data based on arterial blood flow.

Figure 6:
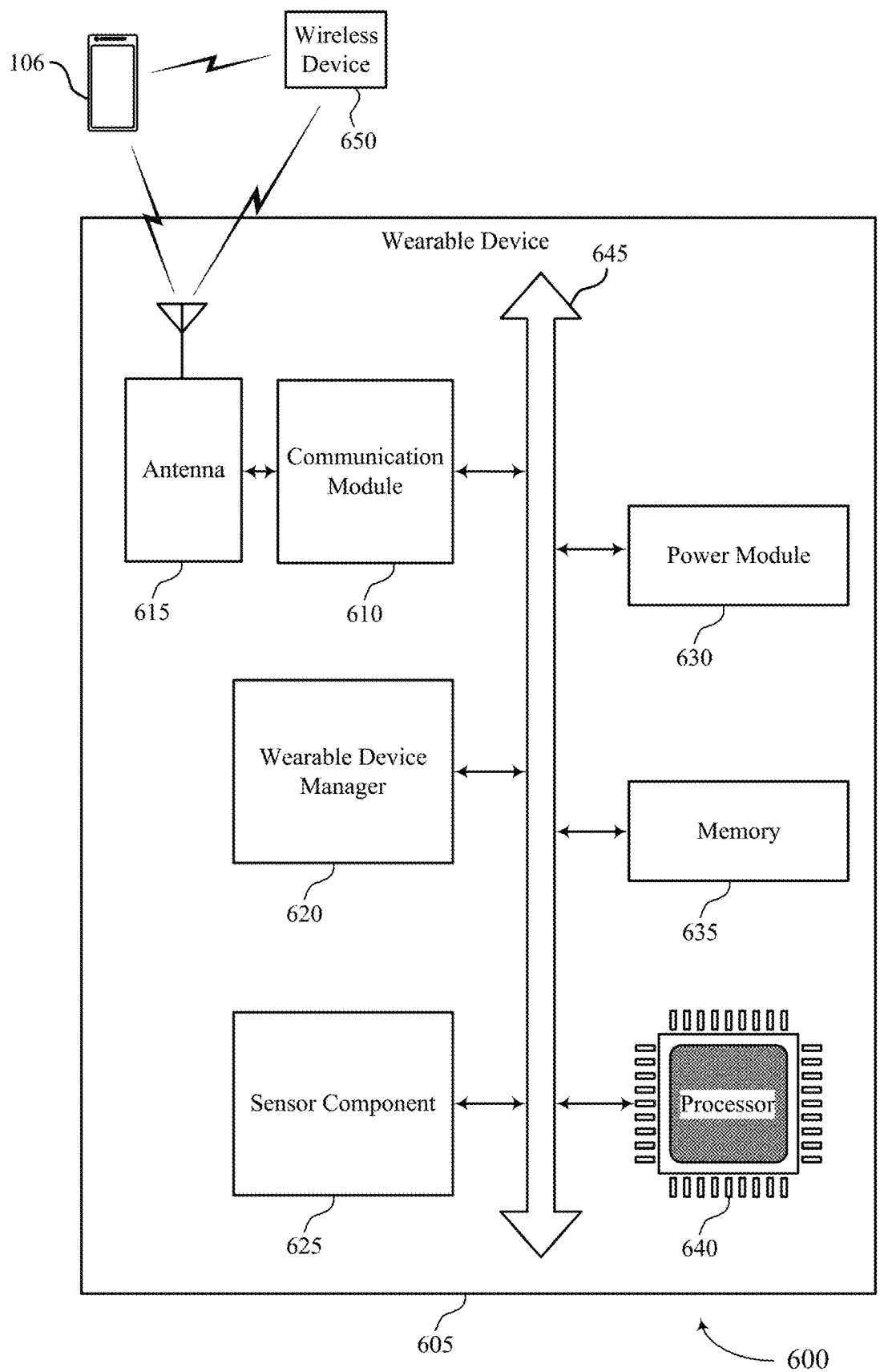
FIG. 6 shows a diagram of a system including a device that supports user authentication by a wearable device in accordance with aspects of the present disclosure.

FIG. 6 shows a diagram of a system 600 including a device 605 that supports user authentication by a wearable device in accordance with aspects of the present disclosure. The device 605 may be an example of or include the components of a device 405 as described herein. The device 605 may include an example of a wearable device 104, as described previously herein. The device 605 may include components for bi-directional communications including components for transmitting and receiving communications with a user device 106 and a server 110, such as a wearable device manager 620, a communication module 610, an antenna 615, a sensor component 625, a power module 630, a memory 635, a processor 640, and a wireless device 650. These components may be in electronic communication or otherwise coupled (e.g., operatively, communicatively, functionally, electronically, electrically) via one or more buses (e.g., a bus 645).

For example, the wearable device manager 620 may be configured as or otherwise support a means for determining, by the wearable device, that a user is wearing the wearable device on a finger of the user. The wearable device manager 620 may be configured as or otherwise support a means for collecting physiological data from the user based at least in part on determining that the user is wearing the wearable device. The wearable device manager 620 may be configured as or otherwise support a means for determining an identity of the user based at least in part on the collected physiological data matching a physiological profile associated with the identity. The wearable device manager 620 may be configured as or otherwise support a means for authenticating the user for an action by the wearable device that requires user authentication.

By including or configuring the wearable device manager 620 in accordance with examples as described herein, the device 605 may support techniques for user authentication by a wearable device.

Figure 7:
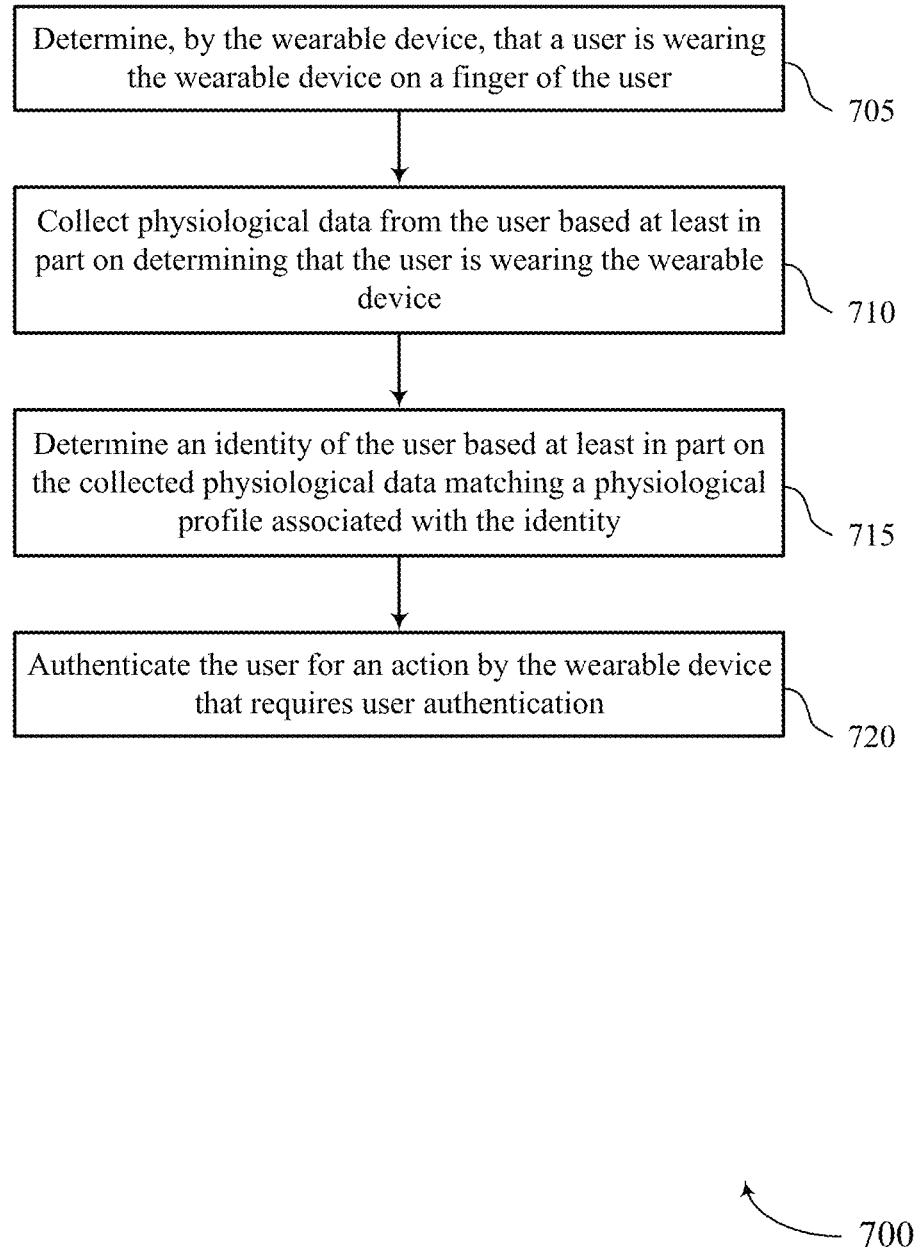
FIG. 7 shows a flowchart illustrating methods that support user authentication by a wearable device in accordance with aspects of the present disclosure.

FIG. 7 shows a flowchart illustrating a method 700 that supports user authentication by a wearable device in accordance with aspects of the present disclosure. The operations of the method 700 may be implemented by a wearable device or its components as described herein. For example, the operations of the method 700 may be performed by a wearable device as described with reference to FIGS. 1 through 6. In some examples, a wearable device may execute a set of instructions to control the functional elements of the wearable device to perform the described functions. Additionally or alternatively, the wearable device may perform aspects of the described functions using special-purpose hardware.

At 705, the method may include determining, by the wearable device, that a user is wearing the wearable device on a finger of the user. The operations of 705 may be performed in accordance with examples as disclosed herein. In some examples, aspects of the operations of 705 may be performed by a processing module 525 as described with reference to FIG. 5.

At 710, the method may include collecting physiological data from the user based at least in part on determining that the user is wearing the wearable device. The operations of 710 may be performed in accordance with examples as disclosed herein. In some examples, aspects of the operations of 710 may be performed by a sensing circuitry 530 as described with reference to FIG. 5.

At 715, the method may include determining an identity of the user based at least in part on the collected physiological data matching a physiological profile associated with the identity. The operations of 715 may be performed in accordance with examples as disclosed herein. In some examples, aspects of the operations of 715 may be performed by a processing module 525 as described with reference to FIG. 5.

At 720, the method may include authenticating the user for an action by the wearable device that requires user authentication. The operations of 720 may be performed in accordance with examples as disclosed herein. In some examples, aspects of the operations of 720 may be performed by a processing module 525 as described with reference to FIG. 5.

It should be noted that the methods described above describe possible implementations, and that the operations and the steps may be rearranged or otherwise modified and that other implementations are possible. Furthermore, aspects from two or more of the methods may be combined.

A method is described. The method may include determining, by the wearable device, that a user is wearing the wearable device on a finger of the user, collecting physiological data from the user based at least in part on determining that the user is wearing the wearable device, determining an identity of the user based at least in part on the collected physiological data matching a physiological profile associated with the identity, and authenticating the user for an action by the wearable device that requires user authentication.

An apparatus is described. The apparatus may include a processor, memory coupled with the processor, and instructions stored in the memory. The instructions may be executable by the processor to cause the apparatus to determine, by the wearable device, that a user is wearing the wearable device on a finger of the user, collect physiological data from the user based at least in part on determining that the user is wearing the wearable device, determine an identity of the user based at least in part on the collected physiological data matching a physiological profile associated with the identity, and authenticate the user for an action by the wearable device that requires user authentication.

Another apparatus is described. The apparatus may include means for determining, by the wearable device, that a user is wearing the wearable device on a finger of the user, means for collecting physiological data from the user based at least in part on determining that the user is wearing the wearable device, means for determining an identity of the user based at least in part on the collected physiological data matching a physiological profile associated with the identity, and means for authenticating the user for an action by the wearable device that requires user authentication.

A non-transitory computer-readable medium storing code is described. The code may include instructions executable by a processor to determine, by the wearable device, that a user is wearing the wearable device on a finger of the user, collect physiological data from the user based at least in part on determining that the user is wearing the wearable device, determine an identity of the user based at least in part on the collected physiological data matching a physiological profile associated with the identity, and authenticate the user for an action by the wearable device that requires user authentication.

Some examples of the method, apparatuses, and non-transitory computer-readable medium described herein may further include operations, features, means, or instructions for initiating the action based at least in part on authenticating the user.

Some examples of the method, apparatuses, and non-transitory computer-readable medium described herein may further include operations, features, means, or instructions for determining that the wearable device may have remained on the finger of the user since authenticating the user, wherein the action may be initiated based at least in part on determining that the wearable device may have remained on the finger of the user since authenticating the user.

In some examples of the method, apparatuses, and non-transitory computer-readable medium described herein, the action comprises a payment transaction.

In some examples of the method, apparatuses, and non-transitory computer-readable medium described herein, the action comprises collecting additional physiological data for the identity.

Some examples of the method, apparatuses, and non-transitory computer-readable medium described herein may further include operations, features, means, or instructions for activating a communication component based at least in part on authenticating the user and based at least in part on a gesture made by the user or a proximity of the wearable device to the user.

Some examples of the method, apparatuses, and non-transitory computer-readable medium described herein may further include operations, features, means, or instructions for deactivating the communication component based at least in part on a threshold duration expiring since activating the communication component, based at least in part on completing the action, based at least in part on the proximity of the wearable device to the user exceeding a threshold distance, or any combination thereof.

In some examples of the method, apparatuses, and non-transitory computer-readable medium described herein, the gesture comprises tapping the wearable device on a payment terminal and the method, apparatuses, and non-transitory computer-readable medium may include further operations, features, means, or instructions for communicating payment information to the payment terminal based at least in part on activating the communication component.

Some examples of the method, apparatuses, and non-transitory computer-readable medium described herein may further include operations, features, means, or instructions for collecting accelerometer data for the user, wherein the gesture may be determined based at least in part on the accelerometer data.

Some examples of the method, apparatuses, and non-transitory computer-readable medium described herein may further include operations, features, means, or instructions for determining the physiological profile over a period of time and storing the physiological profile in a memory of the wearable device, communicating the physiological profile to a user device, or both.

In some examples of the method, apparatuses, and non-transitory computer-readable medium described herein, the physiological profile may be determined in the absence of a wireless connection, the identity of the user may be determined in the absence of a wireless connection, and the user may be authenticated in the absence of a wireless connection.

In some examples of the method, apparatuses, and non-transitory computer-readable medium described herein, the physiological profile comprises PPG data. Some examples of the method, apparatuses, and non-transitory computer-readable medium described herein may further include operations, features, means, or instructions for determining one or more physiological characteristics of the user based at least in part on the PPG data, wherein the identity of the user may be determined based at least in part on the one or more physiological characteristics.

In some examples of the method, apparatuses, and non-transitory computer-readable medium described herein, the one or more physiological characteristics comprises heart rate, heart rate variability, blood pressure, or a combination thereof.

In some examples of the method, apparatuses, and non-transitory computer-readable medium described herein, the physiological data comprises second PPG data and the method, apparatuses, and non-transitory computer-readable medium may include further operations, features, means, or instructions for normalizing the second PPG data based at least in part on an activity being performed by the user, based at least in part on a condition associated with the user, or both.

In some examples of the method, apparatuses, and non-transitory computer-readable medium described herein, the physiological profile comprises a motion pattern associated with movement of the user.

In some examples of the method, apparatuses, and non-transitory computer-readable medium described herein, the motion pattern comprises a predefined hand gesture performed by the user.

In some examples of the method, apparatuses, and non-transitory computer-readable medium described herein, the hand gesture comprises a rotation pattern of the wearable device about the finger of the user.

Some examples of the method, apparatuses, and non-transitory computer-readable medium described herein may further include operations, features, means, or instructions for determining a geographical location of the user, wherein the identity of the user may be determined based at least in part on the geographical location of the user.

Some examples of the method, apparatuses, and non-transitory computer-readable medium described herein may further include operations, features, means, or instructions for determining a proximity of the wearable device to a user device associated with the identity, wherein the identity of the user may be determined based at least in part on the proximity of the wearable device to the user device.

In some examples of the method, apparatuses, and non-transitory computer-readable medium described herein (e.g., when authenticating the user is part of a first authentication procedure), the method, apparatuses, and non-transitory computer-readable medium may include further operations, features, means, or instructions for determining that the user may have removed the wearable device since authentication of the user and performing a second authentication procedure for the user based at least in part on determining that the user may have removed the wearable device since authentication of the user.

Some examples of the method, apparatuses, and non-transitory computer-readable medium described herein may further include operations, features, means, or instructions for activating a communication component based at least in part on authenticating the user and performing an access procedure or sign-in procedure using the communication component.

Some examples of the method, apparatuses, and non-transitory computer-readable medium described herein may further include operations, features, means, or instructions for activating a communication component based at least in part on authenticating the user and initiating a data transfer with another device based at least in part on activating the communication component.

Some examples of the method, apparatuses, and non-transitory computer-readable medium described herein may further include operations, features, means, or instructions for determining that the wearable device is within a threshold distance of the other device, wherein the data transfer may be initiated based at least in part on determining that the wearable device may be within the threshold distance of the other device.

In some examples of the method, apparatuses, and non-transitory computer-readable medium described herein, the physiological data may be collected using one or more sensors of the wearable device and the method, apparatuses, and non-transitory computer-readable medium may include further operations, features, means, or instructions for storing the physiological data in a memory of the wearable device.

In some examples of the method, apparatuses, and non-transitory computer-readable medium described herein, the wearable device comprises a wearable ring device. In some examples of the method, apparatuses, and non-transitory computer-readable medium described herein, the wearable device collects the physiological data based on arterial blood flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a wearable device, comprising:
   determining a physiological profile associated with an identity of a user over a period of time;
   determining, by the wearable device, that the user is wearing the wearable device on a finger of the user based at least in part on a disruption of light detected by a photodetector;
   collecting physiological data from the user based at least in part on determining that the user is wearing the wearable device;
   scaling the collected physiological data to compensate for an impact of one or more biological rhythms on the collected physiological data wherein the impact is relative to the period of time associated with the physiological profile;
   normalizing the scaled physiological data based at least in part on one or more differences between the scaled physiological data and the physiological profile in accordance with an activity being performed by the user, a condition associated with the user, or both;
   determining the identity of the user based at least in part on the normalized physiological data matching the physiological profile associated with the identity; and
   authenticating the user for an action by the wearable device that requires user authentication based at least in part on the normalized physiological data matching the physiological profile associated with the identity.

2. The method of claim 1, further comprising:
   initiating the action based at least in part on authenticating the user, wherein the action comprises a payment transaction or collecting additional physiological data for the identity.

3. The method of claim 2, further comprising:
   determining that the wearable device has remained on the finger of the user since authenticating the user, wherein the action is initiated based at least in part on determining that the wearable device has remained on the finger of the user since authenticating the user.

4. The method of claim 1, further comprising:
   activating a communication component based at least in part on authenticating the user and based at least in part on a gesture made by the user or a proximity of the wearable device to the user.

5. The method of claim 4, further comprising:
   deactivating the communication component based at least in part on a threshold duration expiring since activating the communication component, based at least in part on completing the action, based at least in part on the proximity of the wearable device to the user exceeding a threshold distance, or any combination thereof.

6. The method of claim 4, wherein the gesture comprises tapping the wearable device on a payment terminal, the method further comprising:
   communicating payment information to the payment terminal based at least in part on activating the communication component.

7. The method of claim 6, further comprising:
   collecting accelerometer data for the user, wherein the gesture is determined based at least in part on the accelerometer data.

8. The method of claim 1, further comprising:
   storing the physiological profile in a memory of the wearable device, communicating the physiological profile to a user device, or both.

9. The method of claim 1, wherein the physiological profile comprises photoplethysmogram (PPG) data, the method further comprising:
   determining one or more physiological characteristics of the user based at least in part on the PPG data, wherein the identity of the user is determined based at least in part on the one or more physiological characteristics.

10. The method of claim 9, wherein the one or more physiological characteristics comprises heart rate, heart rate variability, blood pressure, or a combination thereof.

11. The method of claim 1, wherein the physiological profile comprises a motion pattern associated with movement of the user.

12. The method of claim 11, wherein the motion pattern comprises a predefined hand gesture performed by the user.

13. The method of claim 1, further comprising:
determining a proximity of the wearable device to a user device associated with the identity, wherein the identity of the user is determined based at least in part on the proximity of the wearable device to the user device.

14. The method of claim 1, wherein authenticating the user is part of a first authentication procedure, the method further comprising:
determining that the user has removed the wearable device since authentication of the user; and
performing a second authentication procedure for the user based at least in part on determining that the user has removed the wearable device since authentication of the user.

15. The method of claim 1, further comprising:
activating a communication component based at least in part on authenticating the user; and
performing an access procedure or sign-in procedure using the communication component.

16. The method of claim 1, further comprising:
activating a communication component based at least in part on authenticating the user; and
initiating a data transfer with another device based at least in part on activating the communication component.

17. The method of claim 1, wherein the physiological data is collected using one or more sensors of the wearable device, the method further comprising:
storing the physiological data in a memory of the wearable device.

18. A wearable device, comprising:
a processor;
memory coupled with the processor; and
instructions stored in the memory and executable by the processor to cause the wearable device to:
determine a physiological profile associated with an identity of a user over a period of time;
determine, by the wearable device, that the user is wearing the wearable device on a finger of the user based at least in part on a disruption of light detected by a photodetector;
collect physiological data from the user based at least in part on determining that the user is wearing the wearable device;
scale the collected physiological data to compensate for an impact of one or more biological rhythms on the collected physiological data, wherein the impact is relative to the period of time associated with the physiological profile;
normalize the scaled physiological data based at least in part on one or more differences between the scaled physiological data and the physiological profile in accordance with an activity being performed by the user, a condition associated with the user, or both;
determine the identity of the user based at least in part on the normalized physiological data matching the physiological profile associated with the identity; and
authenticate the user for an action by the wearable device that requires user authentication based at least in part on the normalized physiological data matching the physiological profile associated with the identity.

19. A non-transitory computer-readable medium storing code, the code comprising instructions executable by a processor to cause a wearable device to:
determine a physiological profile associated with an identity of a user over a period of time;
determine, by the wearable device, that the user is wearing the wearable device on a finger of the user based at least in part on a disruption of light detected by a photodetector;
collect physiological data from the user based at least in part on determining that the user is wearing the wearable device;
scale the collected physiological data to compensate an impact of one or more biological rhythms on the collected physiological data, wherein the impact is relative to the period of time associated with the physiological profile;
normalize the scaled physiological data based at least in part on one or more differences between the scaled physiological data and the physiological profile in accordance with an activity being performed by the user, a condition associated with the user, or both;
determine the identity of the user based at least in part on the normalized physiological data matching the physiological profile associated with the identity; and
authenticate the user for an action by the wearable device that requires user authentication based at least in part on the normalized physiological data matching the physiological profile associated with the identity.

* * * * *